Nov. 10, 1931.　　　　J. R. McDERMET　　　　1,830,764
METHOD AND APPARATUS FOR TREATING LIQUIDS
Filed Feb. 23, 1929
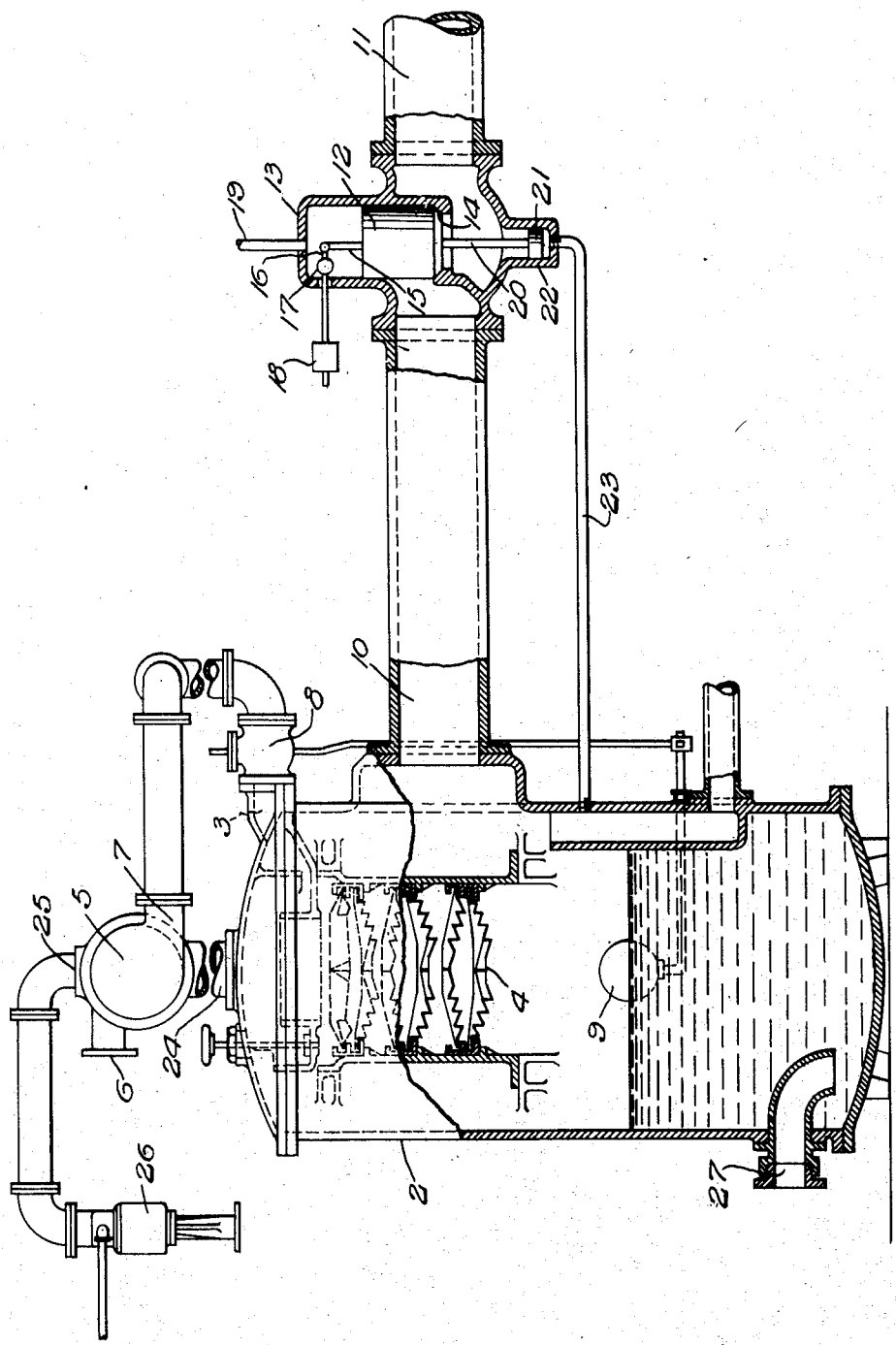
INVENTOR
John R. McDermet
By Byrnes, Stebbins & Parmelee
his attys.

Patented Nov. 10, 1931

1,830,764

UNITED STATES PATENT OFFICE

JOHN R. McDERMET, OF JEANNETTE, PENNSYLVANIA, ASSIGNOR TO ELLIOTT COMPANY, OF PITTSBURGH, PENNSYLVANIA, A CORPORATION OF PENNSYLVANIA

METHOD AND APPARATUS FOR TREATING LIQUIDS

Application filed February 23, 1929. Serial No. 341,921.

The present invention relates broadly to heat exchange apparatus for treating water, and more particularly to deaerating apparatus and method of improving the operation thereof by more effectively controlling the supply of heating medium.

In order to effect the removal of all of the air from water, it is necessary that the partial pressure conditions of the steam in contact with the water be such as to permit the air to escape from the water. Under any conditions in which the partial pressure of the steam in contact with the water is equal, or substantially equal, to the total pressure of the atmosphere in contact with the water, the air in the water will be released. This is true for the reason that the air in the water will tend to establish a pressure equilibrium with the air in the atmosphere in contact with the water, and if the partial air pressure of such atmosphere is negligible, efficient deaeration will be obtained.

At many times it is desirable to effect the heating of water by the use of steam from a source which at times may be insufficient to provide the necessary pressure conditions in the heater to effect the desired deaeration. At many times also, it is desirable to operate the deaerating equipment at a pressure which may be below that corresponding to atmospheric pressure at the location at which the heater is being used.

Under conditions such as above set forth, it will be apparent that the water supplied to the deaerating apparatus will tend to induce as great a steam flow as required to effect heating of the water to substantially the full steam temperature. Without the provision of special controlling means in the steam supply line, the pressure conditions in the deaerating apparatus would be reflected back into the steam line. Where such pressure conditions are sub-atmospheric, there would be a tendency toward air infiltration into the steam supply lines, such that not only would the efficiency of the deaerating apparatus be impaired, but such that the water would be contaminated.

The present invention has for one of its objects the provision of control means in the steam supply line such that steam will be supplied to the deaerating equipment from the source to such an amount that the heat absorption capacity of such equipment will be satisfied so far as possible without reducing the pressure of the steam source below some predetermined minimum for which the control mechanism has been set.

The accompanying figure of the drawing is a diagrammatic elevation, partly in section and partly broken away, of one embodiment of my invention.

In the illustrated embodiment of the invention there is a deaerator 2, of the open feed water heating type, having at its upper portion an inlet 3 for the water to be deaerated. This water is adapted to flow in cascade over a series of agitating devices, herein illustrated as comprising a suitable number and arrangement of trays or pans 4, such that the water is effectively broken up to facilitate the heating thereof and also the release of air and gas therefrom.

The water may conveniently be supplied to the heater through a condenser 5 having the usual inlet 6 and having its outlet 7 connected to the inlet of the deaerator 2. Also, as is customary in this art, the supply of water may be automatically controlled in accordance with demands on the equipment, by the provision of a float operated valve 8, operatively connected to a float 9 located within the deaerator in such manner as to be responsive to fluctuations of the water level therein.

Heating steam may be supplied to the deaerator through a suitable steam inlet 10, which in turn receives its steam from an exhaust steam line 11. In such an exhaust steam line, the total quantity of steam available may vary over a wide range, depending upon the number of auxiliaries which happen to be in operation at a particular time.

In order to prevent the infiltration of air into the line 11, which may be of considerable length, and due to its various connections between sections as well as to the different auxiliaries is susceptible to such air infiltration, it is desirable at all times to maintain therein a pressure which is equal to or slightly above atmospheric pressure. For this purpose I provide a control mechanism in the form of a piston valve 12 working in a cylinder 13 and adapted to cooperate with a valve seat 14. Operatively connected to the piston valve 12 is a link 15, in turn pivotally connected to one end of a lever 16 having a suitable fulcrum 17 and adapted to carry on its outer end an adjustable counterbalance 18. The cylinder 13 is provided with a vent 19 to the atmosphere.

Depending downwardly from the piston valve 12 is a piston rod 20 having secured thereto a piston 21 operative within a cylinder 22 secured to or formed integral with the valve casing. The piston 21 is subject on its upper surface to the pressure conditions existing within the line 11. At its lower side it is subjected to pressure conditions within the deaerator 2 by means of a suitable connection 23, whereby pressure variations in the deaerator are reflected in the cylinder 22.

It has heretofore been proposed in the art to which this invention relates to provide a control valve of a substantially balanced construction which is primarily or entirely responsive to the difference in pressure existing between the exhaust line on the one hand and atmosphere on the other. With the construction herein shown, it will be apparent that if the piston 21 and its associated parts were eliminated, the valve 12 would be primarily subject to a condition such as that referred to, it being obvious that with such a construction if the pressure in the line 11 dropped below atmospheric pressure, the piston valve 12 would assume a position on its seat assuming it to be substantially evenly counterbalanced and free from excessive friction. Such a valve, however, possesses disadvantages which interfere with the efficiency of operation of the deaerating equipment.

I have found that while a piston valve of the character referred to is, theoretically, as far as areas are concerned, operable without regard to the discharge pressure existing for example on the discharge side of the valve seat, the passage of steam through the valve seat exerts a reaction similar to that which occurs, for example, in a turbine nozzle. As a result of this reaction, the load of the valve from the standpoint of pressure maintained on the inlet side, is a varying quality.

By reason of the piston 21 and the connection 23, there is provided a vacuum cylinder which increases the loading on the valve.

With such a construction, if the supply of steam is adequate to operate the deaerating equipment at its water requirement, and at atmospheric pressure, the valve 12 opens and imposes only the predetermined pressure resistance determined by the valve construction. If, however, the supply of steam is inadequate for such an operation, the valve serves to throttle the steam supply in such manner as to maintain atmospheric pressure, or a pressure slightly in excess thereof, in the steam line 11. The deaerating equipment must then predetermine its own operating pressure or vacuum by the supply of steam available. Thus there is a condition in which the valve regulates the supply of steam and the deaerating heater regulates its operating conditions so as to effectively utilize this steam.

I preferably provide a deaerating equipment with an air and gas outlet connection 24 leading into the inter-tube space of the condenser 5 whereby the heat of the vapors and gases escaping from the deaerator is transferred to the incoming water. Non-condensable gases may be withdrawn from the condenser 5 through the outlet 25 in any desired manner, as by an ejector 26. With such a construction, the condenser will tend to withdraw the released vapors and gases from the deaerator 2 and thereby maintain the desired thermal conditions therein with a pressure corresponding approximately to the pressure of saturated vapor at the temperature to which the water is heated in said chamber. Under such conditions, the partial pressure of the steam in contact with the water constitutes substantially the total pressure of the atmosphere within the deaerator, whereby the air is effectively caused to pass out of solution.

The deaerator is provided with any suitable form of outlet connection 27 by means of which the treated water in deaerated condition may be conveyed to the desired point of use.

In accordance with the present invention there is provided an installation operable with a varying steam supply and effective for maintaining a predetermined minimum pressure condition within the supply line. At the same time, the reaction effect of the steam passing the valve seat of the control valve is to a considerable extent offset or counteracted in such manner that a more efficient control of steam is insured. This result is obtained by modifying the operation of the valve in the manner set forth by the pressure conditions existing within the deaerating equipment, whereby the operation of the valve is a function of both the difference between pressure in the supply line on the one hand and atmospheric pressure and deaerator pressure conditions on the other hand.

A balanced valve or substantially balanced valve of the construction heretofore utilized, imposes a pressure even when no vacuum exists in the deaerator, so that there is always a pressure differential existing across such a valve due to the valve construction, and not due entirely to any intrinsic friction quantity. In accordance with the present invention, the modifying connection provided decreases different pressure differentials because of the decreased loading on the valve area under conditions at which the absolute pressure in the deaerator rises. Briefly, the principal values of the supplementary piston is to prevent or minimize the reaction upon the valve due to steam flow therethrough.

While I have herein disclosed for purposes of illustration only, a preferred embodiment of my invention, it will be understood that changes in the construction and arrangement of the parts may be made without departing either from the spirit or the scope of the invention, so long as provision is made for effecting such a modification of pressure conditions as to offset in whole or in part the reaction effect of the fluid being controlled.

I claim:

1. A heat exchanger having a water inlet, a water outlet, a steam inlet, a control mechanism for said steam inlet comprising a valve subjected to steam pressure on one side and substantially atmospheric pressure on the opposite side, and means responsive to pressure conditions in the heat exchanger for modifying the loading action exerted by such atmospheric pressure on the valve.

2. A heat exchanger having a water inlet, a water outlet, a steam inlet, a control mechanism for said steam inlet comprising a valve subjected to steam pressure on one side and substantially atmospheric pressure on the opposite side, and means for modifying the loading action exerted by such atmospheric pressure on the valve, said means including a pressure transmitting connection to the interior of said heat exchanger.

3. A heat exchanger having a water inlet, a water outlet, a steam inlet, a control mechanism for said steam inlet comprising a valve subjected to steam pressure on one side and substantially atmospheric pressure on the opposite side, and means for modifying the loading action exerted by such atmospheric pressure on the valve, said means including a supplemental piston connected to said valve, with means for subjecting said piston to pressure conditions within the heat exchanger.

4. A heat exchanger having a water inlet, a water outlet, a steam inlet, a control mechanism for said steam inlet comprising an unbalanced valve subjected to steam pressure on one side and opposed primarily by atmospheric pressure on the opposite side, and means varying in effectiveness with changes in the exchanger for varying the effectiveness of such atmospheric pressure.

5. A heat exchanger having a water inlet, a water outlet, a steam inlet, a control mechanism for said steam inlet comprising an unbalanced valve subjected to steam pressure on one side and to substantially atmospheric pressure on the opposite side, and means effective for variably counteracting the reaction effect of the steam passing said valve in accordance with pressure variations in the heat exchanger.

6. In the method of controlling the flow of a fluid, the steps comprising providing a valve, subjecting said valve on one side to the pressure of the fluid and on the opposite side to a substantially constant pressure condition, and modifying the effectiveness of such substantially constant pressure condition in accordance with the pressure of the fluid being controlled.

7. In the method of heating water, the steps comprising delivering steam in restricted and variable amounts from a source in which a minimum pressure is to be maintained, throttling the flow of steam from said source substantially in accordance with the pressure difference between said source and the atmosphere to maintain such minimum pressure therein, effecting compensation for the reaction effect of the steam in undergoing such throttling action, and automatically varying such compensation in accordance with the pressure difference between said source on the one hand and atmospheric and discharge conditions on the other hand.

8. A heat exchanger having a water inlet, a water outlet, a steam inlet, a control mechanism for said steam inlet comprising a valve subjected to steam pressure on one side and to substantially atmospheric pressure on the opposite side, and means varying in effectiveness with changes in the heat exchanger for counteracting the reaction effect of the steam passing said valve.

9. A heat exchanger having a water inlet, a water outlet, a steam inlet, a control mechanism for said steam inlet comprising a valve subjected to steam pressure on one side and to substantially atmospheric pressure on the opposite side, and means varying in effectiveness in accordance with the pressure of the steam being controlled for counteracting the reaction effect of steam passing said valve.

10. A control valve comprising a casing, a valve therein subjected to substantially atmospheric pressure on one side and to the pressure within the casing on the opposite side, a piston secured thereto and subjected to pressure conditions within the casing on one side, and means for subjecting the opposite side of said piston to pressure conditions at a remote point.

In testimony whereof I have hereunto set my hand.

JOHN R. McDERMET.